US012582100B2

(12) United States Patent
Ehwald et al.

(10) Patent No.: US 12,582,100 B2
(45) Date of Patent: Mar. 24, 2026

(54) DISPENSER FOR FORMIC ACID VAPOUR AND METHOD FOR MITE CONTROL IN BEEHIVES

(71) Applicant: Famlee Fund GmbH, Freiburg (DE)

(72) Inventors: Rudolf Johannes Ehwald, Müncheberg (DE); Helge Adleff, Berlin (DE)

(73) Assignee: Famlee Fund GmbH, Freiburg (DE)

( * ) Notice: Subject to any disclaimer, the term of this patent is extended or adjusted under 35 U.S.C. 154(b) by 588 days.

(21) Appl. No.: 17/783,115

(22) PCT Filed: Dec. 9, 2019

(86) PCT No.: PCT/EP2019/084252
§ 371 (c)(1),
(2) Date: Jun. 7, 2022

(87) PCT Pub. No.: WO2021/115558
PCT Pub. Date: Jun. 17, 2021

(65) Prior Publication Data
US 2023/0017070 A1    Jan. 19, 2023

(51) Int. Cl.
*A01K 51/00* (2006.01)
*A01M 1/20* (2006.01)

(52) U.S. Cl.
CPC ........... *A01K 51/00* (2013.01); *A01M 1/2044* (2013.01)

(58) Field of Classification Search
CPC ............................. A01K 51/00; A01M 1/2044
See application file for complete search history.

(56) References Cited

U.S. PATENT DOCUMENTS

| 3,604,417 | A | 9/1971 | Stolzenberg |
| 4,193,398 | A | 3/1980 | Refson |

(Continued)

FOREIGN PATENT DOCUMENTS

| DE | 3427330 | 2/1985 |
| DE | 4106624 | 9/1992 |

(Continued)

OTHER PUBLICATIONS

Aumeier P; Von Der Ohe W; Beinert P; Kirchner W, "Use MAQS with Caution!", ADIZ the beekeeper friend, May 2015, vol. 05, pp. 12-13.

(Continued)

*Primary Examiner* — Frederick C Nicolas
(74) *Attorney, Agent, or Firm* — Dicke, Billig & Czaja, PLLC

(57) ABSTRACT

A dispenser for receiving and evaporating a liquid formic acid preparation for combatting varroa mites in a bee hive, the dispenser including an evaporation surface, an evaporation container; a storage container connected to the evaporation container and sealed from the outside in a vapour-tight manner for storing an entire treatment dose of the liquid formic acid preparation; a closable liquid-conducting connection between the storage container and the evaporation container for transferring the liquid formic acid preparation from the storage container to the evaporation container; wherein the evaporation surface is a gas-permeable, fine-pored membrane with a solid content of less than 70% and continuous, exclusively gas-filled pores with a width of between 10 nm and 1000 nm as part of an outer boundary of the evaporation container, the membrane impermeable to liquid mixtures of formic acid and water and liquid-tight under the dynamic pressure of the liquid formic acid preparation.

13 Claims, 5 Drawing Sheets

(56) References Cited

U.S. PATENT DOCUMENTS

| | | | |
|---|---|---|---|
| 4,320,758 | A | 3/1982 | Eckenhoff et al. |
| 4,505,702 | A | 3/1985 | Peery et al. |
| 4,619,652 | A | 10/1986 | Eckenhoff et al. |
| 5,077,102 | A | 12/1991 | Chong |
| 5,395,047 | A | 3/1995 | Pendergrass, Jr. |
| 5,672,167 | A | 9/1997 | Athayde et al. |
| 5,788,155 | A * | 8/1998 | Martin ..................... A61L 9/12 |
| | | | 239/34 |
| 6,569,387 | B1 * | 5/2003 | Furner ................... A61L 9/037 |
| | | | 239/289 |
| 6,837,770 | B2 | 1/2005 | Ruzicka |
| 6,860,993 | B2 | 3/2005 | Effenhauser et al. |
| 7,479,135 | B2 | 1/2009 | Richter et al. |
| 7,976,535 | B2 | 7/2011 | Ehwald et al. |
| 2001/0047161 | A1 | 11/2001 | Wong et al. |
| 2003/0205582 | A1 | 11/2003 | Joshi et al. |
| 2004/0229542 | A1 | 11/2004 | Ruzicka |
| 2006/0009122 | A1 | 1/2006 | Swanson |
| 2007/0088338 | A1 | 4/2007 | Ehwald et al. |
| 2007/0176015 | A1 | 8/2007 | Farrell et al. |
| 2008/0280528 | A1 | 11/2008 | Mudd |
| 2009/0129945 | A1 | 5/2009 | Adleff |
| 2010/0044458 | A1 | 2/2010 | Zabari |
| 2012/0181349 | A1 | 7/2012 | Adleff et al. |
| 2018/0116198 | A1 | 5/2018 | Manhas et al. |

FOREIGN PATENT DOCUMENTS

| | | |
|---|---|---|
| DE | 292141 | 5/1994 |
| DE | 10 2011 000 223 | 7/2012 |
| DE | 10 2017 103 338 | 4/2018 |
| EP | 0093262 | 11/1983 |
| EP | 0959674 | 12/1999 |
| EP | 1 167 757 | 1/2002 |
| EP | 1744798 | 1/2007 |
| EP | 2060286 | 5/2009 |
| EP | 2478765 | 7/2012 |
| EP | 2689679 | 1/2014 |
| EP | 3 578 041 | 12/2019 |
| EP | 3578041 A1 * | 12/2019 ............ A01K 51/00 |
| IT | UB20 153 228 | 11/2015 |
| JP | H1136121 | 2/1999 |
| WO | 94/05354 | 3/1994 |
| WO | 94/19043 | 9/1994 |
| WO | 94/23765 | 10/1994 |
| WO | 97/32470 | 9/1997 |
| WO | 2004/062714 | 7/2004 |
| WO | 2005/107835 | 11/2005 |
| WO | 2010/076003 | 7/2010 |

OTHER PUBLICATIONS

Charriere J-D, Five Formic Acid Dispensers in Compariston, Swiss Center for Bee Research, URL: www.imkerverband-sgap.ch/up/files/DispenserVergleich Agro-scope1998.pdf, 1998.

Daniels RS; Abdulkareem H; Roger R EL; Mackenzie K, "Membrane-barrier delivery of formic acid, a chemical used for mite control in honey bees (*Apis mellifera*)", Journal of Apicultural Research, 1999, vol. 38, pp. 63-69.

Johnsen B K, About the Influence of Sald Additives on the Phase Equilibrium of Aqueous Formic Acid, 1954, URL: e-collection. library. ethz. chleservl eth:32505/eth-32505-02.pdf.

Yu-Chuan Su, Liwei Lin and A. P. Pisano, "A water-powered osmotic microactuator," in Journal of Microelectromechanical Systems, vol. 11, No. 6, pp. 736-742, Dec. 2002, doi: 10.1109/JMEMS. 2002.805045.

F. Theeuwes and S. I. Yum, "Principles of the Design and Operation of Generic Osmotic Pumps for the Delivery of Semisolid or Liquid Drug Formulations", ALZA Research, Oct. 20, 1976.

Amrine J, Noel R (2006): Formic acid fumigator for controlling varroa mites in honey bee hives, International Journal of Acarology, DOI: 10. 1080/01647950608684452.

Liebig G: Einfach imkern—Leitfaden zum Bienenhalten, Verlag Dr. G. Liebig, Emscherstr. 3, Bochum, 3rd ed. Aichtal 2011.

* cited by examiner

DISPENSER FOR FORMIC ACID VAPOUR AND METHOD FOR MITE CONTROL IN BEEHIVES

CROSS-REFERENCE TO RELATED APPLICATIONS

This Utility Patent Application claims priority under 35 U.S.C. § 371 to International Application Serial No. PCT/EP2019/084252, filed Dec. 9, 2019, which is incorporated herein by reference in its entirety.

BACKGROUND

The treatment of bee hives with formic acid vapour is of economic importance in Europe, the USA and Canada, among others. It is part of the control of the parasitic mite *Varroa destructor* necessary for the survival of bee colonies and is carried out using various formic acid vapour dispensers in Germany, mainly in late summer and autumn, and is often combined with oxalic acid treatment in winter. The main aim of formic acid vapour treatment is to reduce mite infestation of the larvae in the brood combs, into which the formic acid only penetrates in the form of its vapour.

The so-called short-term treatment with formic acid vapour, in which, for example, a sponge cloth soaked in formic acid is inserted into a cavity above or below the combs of the hive, can be described as shock therapy, because initially high formic acid vapour concentrations occur in the hive for a short time (Liebig 2011). A better regulated vapour release is achieved with the help of the Kramer plate, in which the formic acid is bound to a soft fibre board and the evaporation surface can be adjusted to the demand by the number and size of evaporation windows in an enveloping plastic film. Since the degree of swelling of the fibre board influences the vapour pressure and permeability of the formic acid, the evaporation rate also decreases significantly with time in this dispenser.

A strong initial concentration of formic acid vapour is also achieved with the Mite Away Quick Strips (MAQS), according to patent application US 2008/0280528A1, which are placed in a cavity under the lid of the hive. The MAQS dispenser binds the formic acid to a gel pad with a wick-like evaporation surface confined by evaporation windows in a sheath. It combines a short-term shock effect with a longer-lasting and gradually decreasing release of formic acid vapour and, in addition to the advantage of a relatively high efficacy against mites, has application advantages (Aumeier et al. 2011). For long-term treatment, the Nassenheider dispenser (EP 0 959 674 B1), the formic acid application with medicine bottle and the Liebig dispenser, among others, have been developed (Liebig 2011). In the long-term treatment, the formic acid preparation is transferred from a storage container into a wick and evaporation takes place on a capillary-absorbing evaporation surface, e.g. sponge cloth or filter paper, whereby the evaporation surface gradually increases to a certain value. This gradually increases the concentration of formic acid vapour in the hive, and the dose administered is spread over a longer period of time. This makes it easier to prevent the bees, especially the queens, from being exposed to a toxic dose.

Ruzicka describes in U.S. Pat. No. 6,837,770 B2 a dispenser in the form of a plate with a core consisting of open-pored ant acid-resistant organic foam, for example phenolic resin foam. The still dry core is initially wrapped in a liquid-impermeable film. To fill the dispenser with formic acid preparation, the wrapped plate is cut into two halves and the core of the halves is saturated capillary with the liquid formic acid preparation. The cut surface acts as an evaporation window. One advantage of this dispenser is its convenient use and the high volume-related capacity of the core for the formic acid preparation. In most formic acid dispensers used so far, the space of an empty frame is used as the vapour distribution space. With the Nassenheider dispenser in the vertical application form and with the dispenser according to Burmeister (Charriere J-D, 1998), the distribution space is an empty comb frame at the edge of the brood nest.

The dispenser according to U.S. Pat. No. 6,837,770 B2 is fixed in a vertical position in a space between the hive wall and the outer frame, with the evaporation surface at the bottom. In the application of the formic acid dispensers mentioned so far, the evaporation surface is adjacent to a distribution space for the formic acid vapour, the air of which is far below the broodnest temperature in cool weather and has a high relative humidity. The formic acid vapour treatment of the colonies is usually carried out in late summer directly after the honey harvest and a second time after feeding. Infestation with the parasitic mite is particularly strong at the times mentioned (in Central Europe from the end of July to the beginning of September). Frequent weather extremes, especially the occurrence of cold nights, complicate the planning and implementation of late summer and autumn treatment with formic acid vapour. During the treatment period, the temperature of the dispensers is often below 15° C. Therefore, the absorption of water vapour at the evaporation surfaces cannot be ruled out with the dispensers known so far. Due to the special azeotropic properties of formic acid-water mixtures, the absorption-related dilution of formic acid at the evaporation surface reduces the relative volatility of formic acid much more than would be expected according to Raoult's law. From the investigation of Johnsen (1954) it is evident that only at a relative humidity below 60% at the evaporation surface a water content of the formic acid preparation is maintained at which both components of the liquid preparation assume a stationary relative volatility and thus, comparable to the boiling liquid azeotrope, leave the evaporation site with approximately the same relative velocity. The cold-induced absorption of water vapour at the evaporation surfaces leads to a dilution of the formic acid and an associated very strong decrease in its relative volatility. Cool weather therefore causes underdosing with too little mite fall. Attempts have been made to solve the problem of the low evaporation rate of the formic acid preparation at low outdoor temperatures by means of heating, for example in the form of a grave light. Amrine J and Noel R (2006) describe a formic acid dispenser in which the evaporation surface is adjacent to an air space above the combs and faces the combs, so that the evaporation surface is exposed to the air heated in the brood nest. This dispenser has a wooden frame to be placed on the frame with the honeycomb frames as well as a wooden inner frame to be inserted into this frame, which is covered at the top, except for a narrow bee path, with an aluminium sheet or a plastic plate. An absorbent fabric for capillary binding of the formic acid preparation is attached under the cover with the aid of a grid. The moist fabric is exposed to the rising warm air and releases formic acid vapour into the vapour distribution space above the combs, which is called the activation cavity and is bounded by the inner frame. Even with this procedure, it is unavoidable that cool outside air will have a strong effect on the evaporation rate due to heat conduction and thus negatively affect the efficiency of formic acid treatment. A sufficiently high evaporation rate in cold weather is achieved by using the medicine bottle in conjunction with a soft fibre board (Liebig 2011). Since the board placed on the frames of the brood nest is in direct contact with the brood nest, it releases the formic acid vapour on its underside, which is warmed by the brood nest, directly into the honeycomb alleys it covers. Even with this method, a strong temperature gradient from the underside of the plate to the upper side and a strong dependence on the weather is unavoidable at low outside temperatures. If it is used in warmer outdoor climates, there is a risk of overdosing with high toxicity to the bees and loss of the queen. With all known formic acid dispersers, the area-related evaporation rate is highly dependent on the outdoor climate. Previously known formic acid dispensers for mite control in hives expose the evaporation surfaces moistened with the liquid formic acid preparation or the evaporation windows formed in a gas-tight cover for vapour release wholly or partially into a wide air space outside the brood nest, resulting in the dependence of the vapour release rate on the external climate. Presumably, the usual expansion of the hive volume or the insertion of an empty frame for treatment with formic acid vapour is related to the obvious idea that this is the only way to achieve an effective convective distribution of the vapour in the air of the hive.

The dispersers mentioned so far are hazardous to health if used negligently because either the open acid or surfaces of the dispenser that are moistened with the formic acid preparation have to be handled. The necessary precautions and protective clothing complicate the formic acid treatment. For this reason and to control the evaporation rate, the use of a dispenser with membrane-controlled evaporation using a vapour-permeable and liquid-impermeable latex membrane was proposed by Daniels et al. (1999). Also in patent application DE 10 2011 000223 A1, the use of a membrane permeable to gases such as formic acid vapour and water vapour and impermeable to liquid water and formic acid is described for protection against the liquid formic acid. This membrane is covered with a vapour-tight film before the dispenser is used. However, the problem of possible skin contact with formic acid is not yet solved by covering the gas-permeable and liquid-impermeable membrane with a gas-impermeable layer. In this case, too, the outside of the gas-permeable liquid barrier may become moistened with the formic acid preparation due to condensation.

BRIEF SUMMARY OF THE INVENTION

The object of the invention is to provide a user-friendly dispenser for formic acid vapour in bee hives, which enables an evaporation rate that is largely independent of the external climate without additional heating, while avoiding the above-mentioned disadvantages. A further object is to provide a convenient, inexpensive and risk-free method of formic acid treatment of bee hives. According to the invention, the task is solved by a dispenser for formic acid vapour according to any one of claims 1 to 5 in combination with a method for treating a bee hive for mite control according to any one of claims 6 to 12.

DETAILED DESCRIPTION OF THE INVENTION

Figure 1:
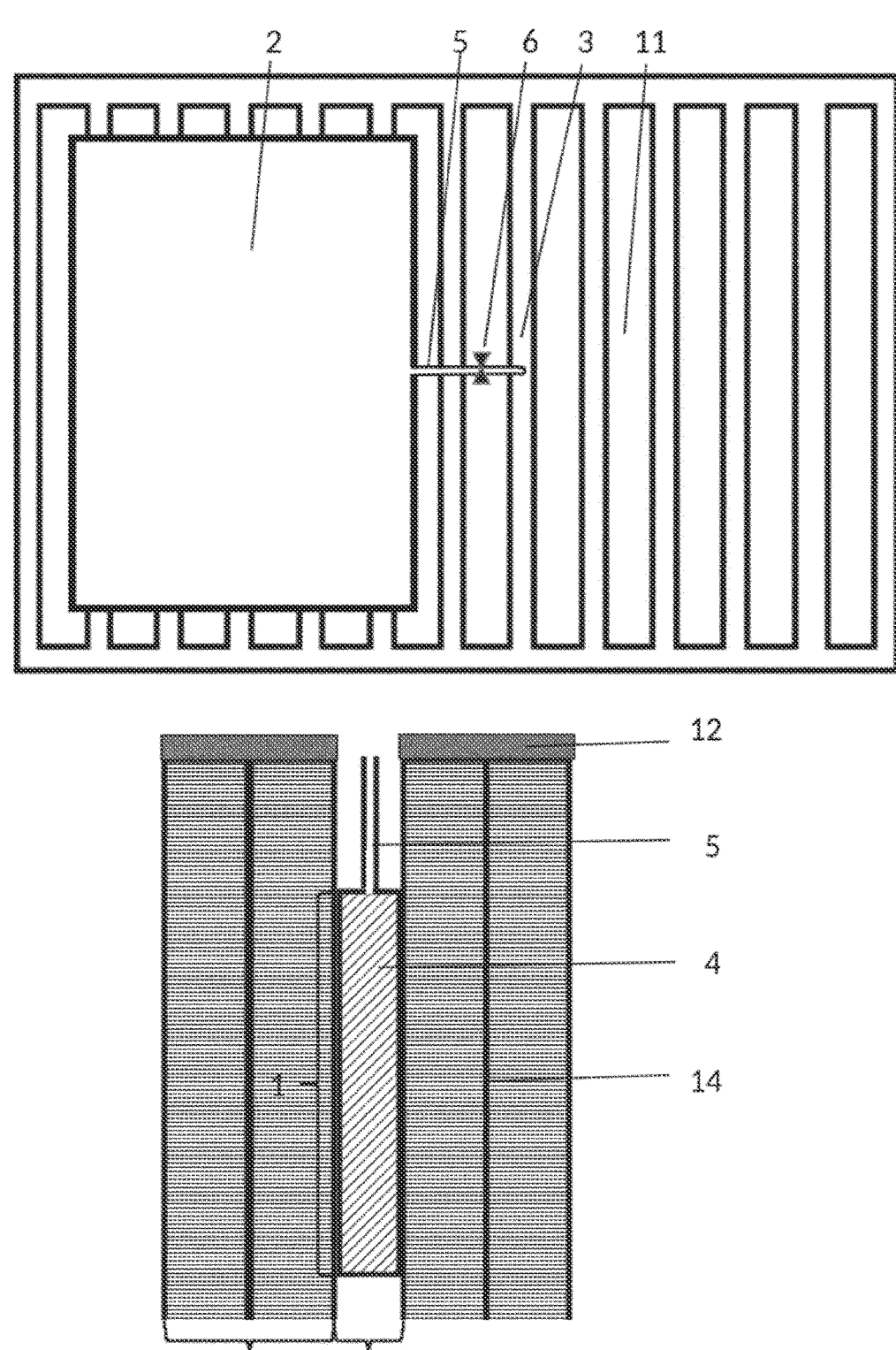
FIG. 1 shows main features of the dispenser according to the invention schematically.

Main features of the dispenser according to the invention are shown in FIG. 1. It contains two interconnected compartments for introducing a liquid formic acid preparation, one of which is outwardly delimited in whole or in part by the evaporation surface and is hereinafter referred to as evaporation container 1, and a further compartment which is outwardly sealed in a gas-tight manner and is hereinafter referred to as storage container 2.

The dimensions of the evaporation container make it possible to place it in an air space directly adjacent to the brood nest combs and comb alleys 3 of the brood nest or located in a comb alley without expanding the hive volume and without the use of an empty frame, thereby exposing the evaporation surface 4 to the air space of a comb alley or to an air flow path integrated into the evaporation container leading through the brood nest.

The evaporation surface is bounded by a layer impermeable to the liquid formic acid preparation but highly permeable to its vapour and other gases, called a gas-permeable liquid barrier. A gas-permeable liquid barrier in the form of a highly porous sheet membrane or tubular membrane made of a hydrophobic material, for example a polyolefin, is suitable for limiting the evaporation surface. In examples, the gas-permeable liquid barrier comprises a fine-pored membrane with a solids content of less than 70%. Gas-permeable liquid barriers with the above-mentioned properties find numerous applications, for example for the manufacture of waterproof gas-permeable clothing, passive valves, porous spacers and devices for gas exchange with liquids such as artificial lungs and the like. They are available, for example, as industrial bulk products consisting of polypropylene with the brand names Accurel®, Celgard®, Oxyphan® and Treo-Pore®. The gas-permeable liquid barrier for use according to the invention, like the porous polypropylene membranes mentioned, consists of hydrophobic material. It has continuous gas-filled pores with a width between 10 nm and 1000 nm; the pore volume exceeds 30% by volume.

In a preferred embodiment of the dispenser according to the invention, the membrane thickness is less than 300 μm. The above features ensure that the evaporation rate is not hindered by the gas-permeable liquid barrier. Membranes with the mentioned characteristics withstand a dynamic pressure of water and formic acid up to several bar. This reliably prevents the formic acid preparation from leaking out of the evaporation container when the storage container is positioned above the evaporation container and the liquid formic acid preparation flows from the storage container into the evaporation container to replace the evaporated amount. The above values for porosity, membrane thickness and pore width result in a high permeability for gases and vapours (>2 mm s$^{-1}$) which does not limit the area-related evaporation rate at the air flow velocities realised in a bee hive.

A gas-permeable liquid barrier with the above-mentioned properties cannot limit the evaporation rate because its vapour permeability far exceeds that of the laminar flowing outer air layers. Because of the dynamic pressure resistance of these membranes, the constant supply of the formic acid preparation to the evaporation surface is simplified; a wick becomes superfluous. Evaporation is not membrane-controlled due to the extremely high gas permeability of the gas-permeable liquid barrier used, in contrast to the method described by Daniels et al. (1999) with a latex membrane; this allows extremely high area-related evaporation rates at the temperature of the brood nest, as will be shown below. Due to the high area-based evaporation rate at a gas-permeable liquid barrier of the type described under dynamic pressure, the possibility arises for a new type of formic acid dispenser with a small evaporation container, which can be brought into close heat-conducting relationship with the brood nest combs without changing the number of comb frames or spatially expanding the hive.

The problem of the limited volume capacity of an evaporation container according to the invention is solved by using a storage container connected to the narrow evaporation container to hold the treatment dose. It can be placed in the hive outside the brood nest or even outside the hive; it does not have to be in close heat-conducting relation to the brood combs.

The division of the liquid treatment dose into two compartments, a large-lumen storage container and a small evaporation container, allows the evaporation surface to be placed in relatively narrow air spaces where the air is passed through or over the brood nest. During the use of the dispenser, the evaporation container is in direct contact with the combs or it is located in a honeycomb alley or it lies on the upper beams of the honeycomb frames. In all cases, the evaporation container is in close heat-conducting contact with the brood nest combs, so that its temperature is determined to a greater extent by the brood nest temperature than by the outside temperature. In contrast to known methods of treating a hive with formic acid vapour, the method according to the invention does without a wide air space for distributing the formic acid vapour in the hive, the temperature of which is significantly below the temperature of the brood nest combs. This excludes the condensation of water on the evaporation surface.

The method of treating a hive for mite control according to the invention comprises placing an evaporation container in the hive in conjunction with exposing its evaporation surface in a honeycomb alley of normal width up to 12 mm, a space between the brood nest honeycomb frames and the hive roof or another frame, or in an air flow path integrated in the evaporation container and leading through the brood nest. Placing the evaporation container in an air space adjacent to the brood nest allows the release of formic acid vapour into the air thermally or mechanically agitated by bee activity, which is characterised by a high water vapour saturation deficit. Effective heat conduction from the brood combs, whose temperature is about 35° C., to the evaporation container causes a high and approximately constant vapour pressure of the formic acid at the evaporation surface. The relative humidity regulated to a value of about 40% by the bees is below the relative humidity of a 60% solution of formic acid in water, so that the superficial condensation-related dilution of the formic acid is avoided. This allows for an evaporation rate that is relatively independent of the outdoor climate. This rate is substantially determined by the air flow near the evaporation surface and its geometry.

The evaporation container can be suspended from above in a honeycomb alley of the brood nest and connected to a storage container by means of a closable liquid conduit, the latter being placed on the upper beams of the honeycomb frames as a flat extended container as shown in FIG. 1. If the state of consumption is to be made visible, the storage container can also be placed outside the hive, whereby the connecting pipe is led through the hive wall or a flight hole, for example.

Figure 2:
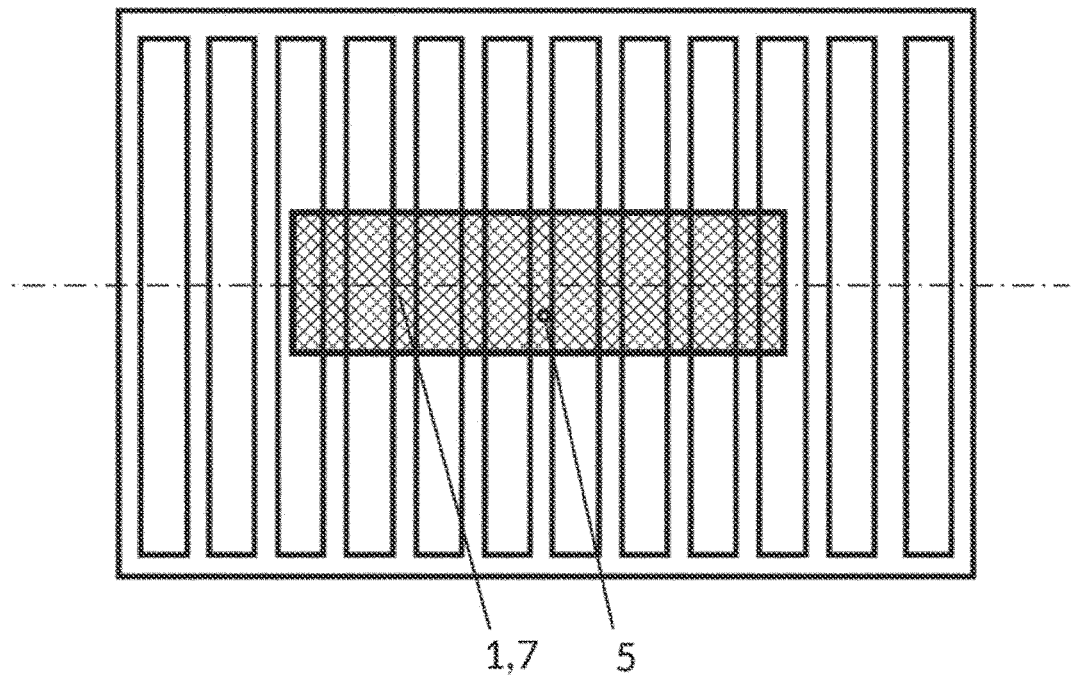
FIG. 2 shows schematically an evaporation container which is placed on the honeycomb frames and covered by a heat-insulating layer.
Figure 2:
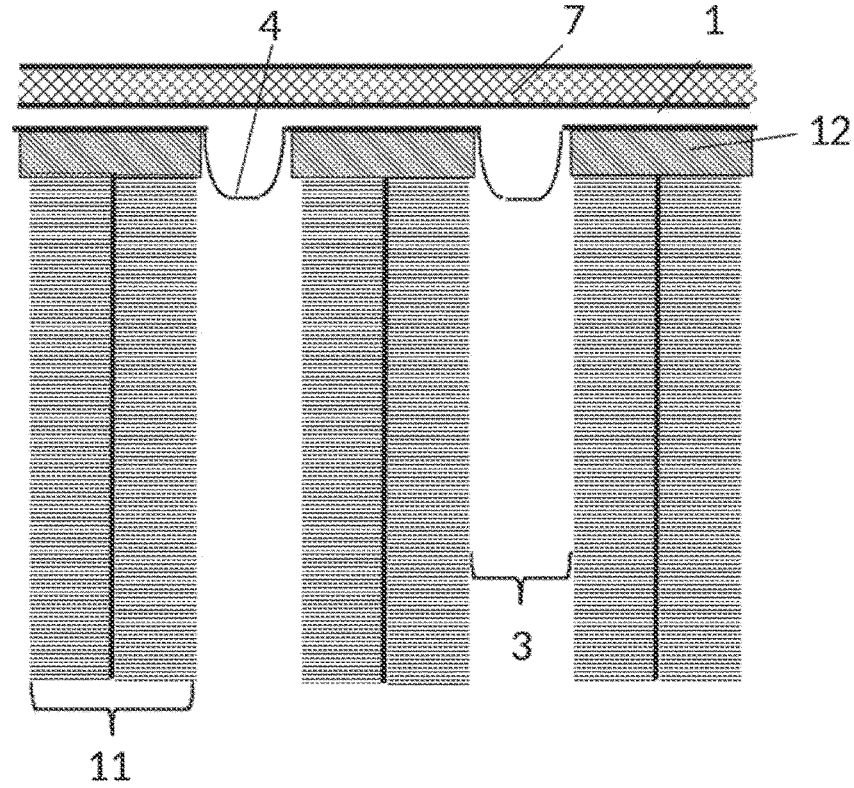

According to the invention, the evaporation container can be placed on the honeycomb frames above the brood nest, whereby the membrane-limited evaporation surface is placed on the air space of several honeycomb alleys, as shown schematically in FIG. 2. In this way, the vapour from above is distributed simultaneously to several honeycomb alleys. In this method, covering the evaporation container with a heat-insulating layer is advantageous for maintaining a constant temperature at the evaporation surface in a cool outdoor climate.

In an advantageous embodiment of the invention, the outer cover of the dispenser comprises a closed film bag formed of polyethylene, polypropylene or other hydrophobic, flexible and weldable polymer, wherein a sealing outer clamping device is used to separate the evaporation container from the storage container. For this purpose, it is advantageous if the evaporation container contains an inner skeleton, for example in the form of a grid plate, to ensure the subsequent flow of the liquid formic acid preparation to the gas-permeable membrane.

Figure 3:
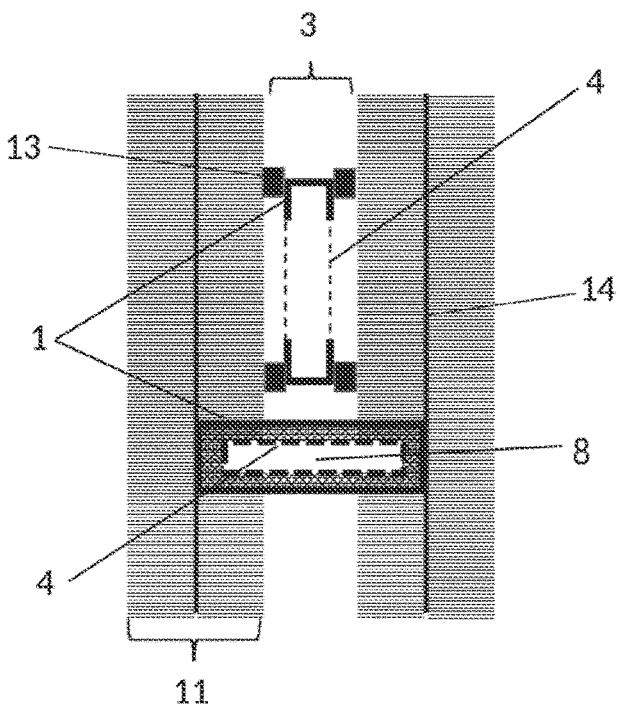
FIG. 3 shows a schematic view of a section through two honeycomb frames with evaporation containers with different positions of the evaporation surfaces, which are bordered by a gas-permeable liquid barrier.
Figure 3:
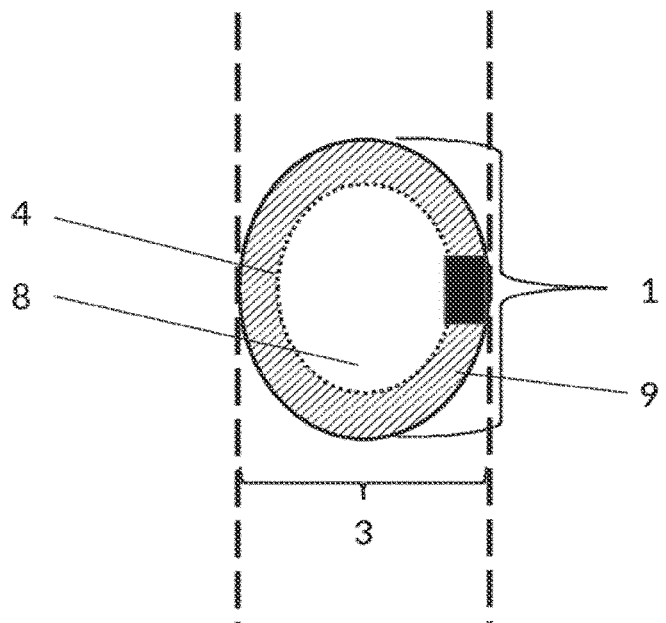

The evaporation container can be placed in the honeycomb alley as shown in FIG. 3, above, or in another space between two honeycomb frames. It adjoins the honeycombs on both sides of the honeycomb alley, as shown in the centre of FIG. 3. In the latter case, the evaporation container is fixed in position, for example, when the still empty honeycomb frames are hung up, and the introduction of the treatment dose into the evaporation container takes place after the brood combs have been built. In this case, the evaporation container is placed in such a way that it is surrounded by brood combs during treatment and its evaporation surface is adjacent to the integrated air flow channel. The evaporation container can be designed in such a way that the air flow channel is surrounded by a flexible inner wall, in which the gas-permeable liquid barrier is integrated, an elastic sieve fabric 9 and a flexible liquid-tight outer wall, as shown in FIG. 3, below. This allows the evaporation container to be easily inserted into the honeycomb alley where it is elastically fixed. The integration of the air flow path in the evaporation container makes it possible to thermally conduct the gas loaded with the formic acid vapour upwards and distribute it in the hive air above the combs without the risk of a bee-toxic local formic acid vapour concentration. In the embodiments of the evaporation container shown in FIGS. 1 to 3, there is thermally conductive contact with the brood combs bounding the honeycomb alley.

If the connecting pipe between the storage container and the evaporation container can be closed, the treatment dose of the formic acid preparation can initially be enclosed in the vapour-tight storage container. This makes it possible for the beekeeper to safely use a prefabricated dispenser already filled with the treatment dose. An advantageous possibility for this is shown schematically in FIG. 4. The already filled, stackable dispenser is suitable for storage and distribution before the connecting pipe is opened. When the evaporation container is removed from the packaging 10, the connecting pipe opens by being pulled out of the clamp 6 and the liquid formic acid preparation can be transferred into the evaporation container.

Surprisingly and unexpectedly, it was found that the formic acid vapour release rate of about 10 g per day recommended for high mite mortality is already achieved with an evaporation surface of 10 cm$^2$ when prototypes of the dispenser according to the invention are used at a temperature of 35° C. in slowly moving dry air with a formic acid concentration of 60%. The area-dependent evaporation rate reached similarly high values and was far above the area-dependent evaporation rate of previously known dispensers when the prototypes of the evaporation container shown schematically in FIG. 1 below were introduced into the comb alley of a bee hive during late summer. This demonstrates that a wide vapour distribution space outside the comb space is not necessary to avoid vapour saturation at the evaporation surface. The explanation for this could be an unexpectedly high flow rate of air through the brood nest.

Embodiments (1): Evaporation containers made of polypropylene of the type shown in FIG. 3, above, with an evaporation surface of 9 cm$^2$, whose evaporation windows were closed by a gas-permeable liquid barrier in the form of the 25 µm thick Treo-Pore® membrane PDA 25, were connected to a silicone tube and a storage vessel in the form of a graduated 25 ml pipette. The evaporation container were suspended in a heated ventilated air space with a temperature of 35° C. and a constant supply of fresh air. The hourly evaporation rate of a 60% formic acid was determined in the pipettes by reading the liquid volume. The evaporation rate related to the evaporation surface was 52 to 62 mm$^3$ cm$^{-2}$ h$^{-1}$. Thus, a daily evaporation rate of more than 10 ml per day was already achieved with an evaporation surface of less than 10 cm$^2$. The described formic acid dispenser was tested in late summer in several hives consisting of two frames, with a connecting tube running through the hive wall. The evaporation rate related to the surface area was 21 to 25 mm$^3$ cm$^{-2}$ h$^{-1}$. Thus, the daily delivery rate of 6 to 10 cm$^3$ recommended for an effective treatment was achieved with an evaporation surface area of only 15 cm$^2$.

(2): A dispenser according to the invention of the type shown in FIG. 5 has an outer shell in the form of a sealed film bag. The outer flexible polymer sleeve of the dispenser, which is suitable for placing on the honeycomb frames, is formed from a 10 cm wide film tube consisting of polyethylene with a wall thickness of 200 µm. One end of a 50 cm long tube segment is sealed by thermal welding. A 4 cm wide and 18 cm long evaporation window is cut out in the film bag formed in this way. With the help of a siloxane transfer film, a gas-permeable 20 µm thick polypropylene membrane is glued onto the window from the inside. The membrane has a pore space of 50 to 60% with a pore size between 20 and 200 nm. The treatment dose—150 ml of a mixture of formic acid (60%) and water (40%)—is poured into the open bag. The foil bag is clamped tightly over the liquid mixture with a commercially available clamping closure for foil bags (Gimex Easy Fresh) at a distance of about 18 cm from the weld seam; the clamped-off part of the bag containing the formic acid mixture forms the storage container 2. A 20 cm long and 9 cm wide inner skeleton in the form of an inner skeleton made of LDPE is inserted into the part of the bag lying above the bag closure. The end of the bag that is still open is closed by thermal welding so that a 25 cm long closed evaporation container 1 is created. If the dispenser is placed upright with the liquid treatment dose in the basal position, the empty evaporation container can be folded back downwards at the bag closure. In this upright position, the dispenser is placed in a suitable transport container together with other dispensers and stored in the hive until use. For use, the dispenser is taken out of the transport container, the bag closure is temporarily removed, the contents of the storage container are transferred to the evaporation container and the evaporation container is closed again with the bag closure. The dispenser is positioned on the honeycomb frames of the hive in such a way that the membrane-limited evaporation window rests transversely to the course of the honeycomb frames on the upper beams above the brood nest, whereby the evaporation surface exposed in 5 honeycomb alleys covers a total of 22 to 24 cm$^2$. The aforementioned work of inserting the dispenser is risk-free because the formic acid-water mixture cannot come to the surface of the dispenser. Both the emptied storage container and the now filled evaporation container fit into the space between the hive roof and the comb frames or into the space between the frames of a multi-frame hive. The end of the empty evaporation container can be folded or inserted into the space between the outer wall and the frames. The evaporation surface is exposed to the air rising in the honeycomb alleys in the brood nest area, with heat-conducting contact with the honeycomb frames in the brood nest area. Accordingly, evaporation takes place at a high temperature above 30° C., which is kept relatively constant by the bees. If one wants to reduce the influence of a cool and humid outdoor climate even more, the evaporation container is covered with a heat-insulating layer. Evaporation is promoted by the strong air flow rising in the honeycomb alleys and the water vapour saturation deficit actively produced by the bees, even if the outside air is at a low temperature and saturated with water vapour.

DESCRIPTION OF THE FIGURES

FIG. 1 schematically shows a dispenser whose evaporation container 1 (bottom) is connected to a storage container 2 (top). The evaporation container is located in the honeycomb alley 3 into which it exposes the evaporation surface 4 bounded by the gas-permeable liquid barrier. The evaporation container is connected to the storage container, a shallow container with a capacity of about 120 cm$^3$ and a base area of about 200 cm$^2$, by a connecting pipe 5. The entire treatment dose of the liquid formic acid preparation is in the gas-tight sealed storage container before treatment. To start the formic acid vapour treatment, the liquid formic acid preparation is fed into the evaporation container by opening the clamp 6.

FIG. 2 shows schematically an evaporation container which is placed on the honeycomb frames 11 and covered by a heat-insulating layer 7. Top: Top view of the honeycomb frames, the honeycomb alleys and the evaporation container. The evaporation surface bounded by the gas-permeable liquid barrier rests on the upper beams 12 of the honeycomb frames and is exposed to the air space of the honeycomb alleys of the brood nest. Below: Section of a cross-section through the evaporation container perpendicular to the course of the honeycomb frames.

FIG. 3 shows a schematic view of a section through two honeycomb frames with evaporation containers with different positions of the evaporation surfaces, which are bordered by a gas-permeable liquid barrier. Top: The evaporation container has been placed in the honeycomb alley to treat the hive and exposes two evaporation surfaces to the honeycomb alley. Spacers 13 ensure a defined airflow path and good heat conduction and prevent the evaporation windows from contacting the combs. Centre: The evaporation container was placed in the space between the centre walls 14 of two honeycomb frames before the honeycombs were built. It adjoins the combs of both frames during the treatment period and encloses an airflow path 8 through the brood nest, separated from the honeycomb alley. Below: The evaporation container has an integrated air flow path, a flexible outer wall impermeable to formic acid vapour and a flexible inner wall in which the evaporation surface is integrated. In the position of the evaporation surface, the inner wall is formed by a gas-permeable liquid barrier. The evaporation container contains an elastic screen fabric 9 made of polystyrene to ensure the distance between the outer and inner walls and to guarantee elasticity.

Figure 4:
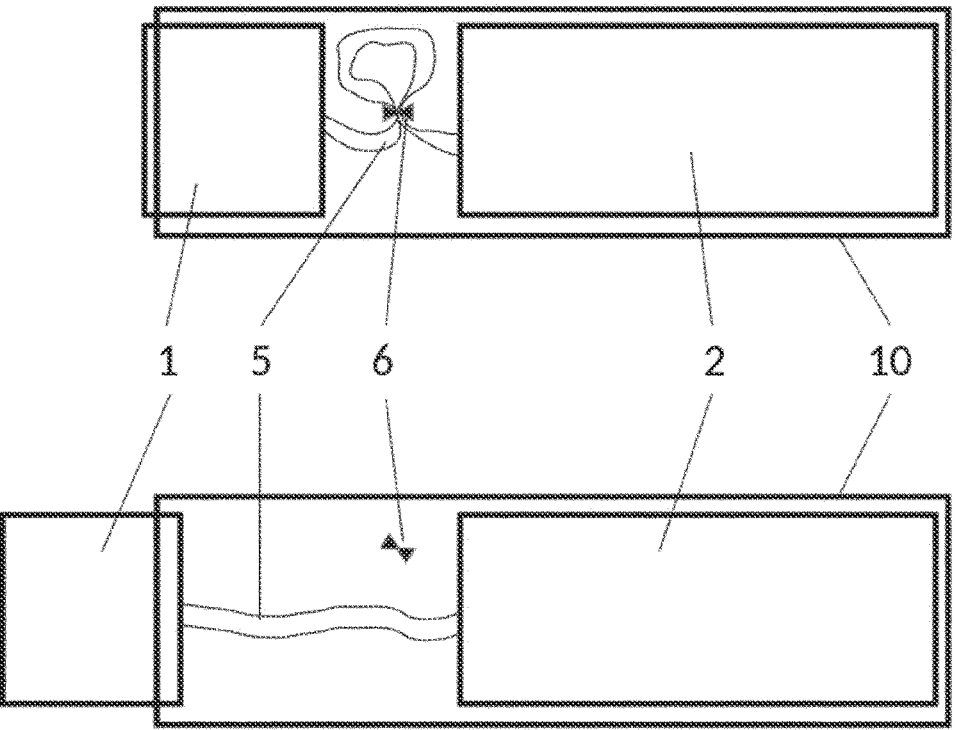
FIG. 4 shows in a schematic view a longitudinal section through a dispenser according to the invention with a clamping device which opens when the evaporation container is removed from the packaging.

FIG. 4 shows in schematic view a longitudinal section through a dispenser according to the invention with a clamping device which opens when the evaporation container is removed from the packaging 10. Top: For storage of the dispenser before use, the connecting pipe 5 between the storage container 2 and the evaporation container 1 is tightly clamped with a clamp 6. The liquid formic acid preparation is only in the storage container and the part of the connecting pipe that lies between the clamp and the storage container. The clamp prevents the formic acid preparation from being transferred to the evaporation container. Below: By pulling the evaporation container out of the packaging, the connecting line has been stretched and pulled out of the clamp. The formic acid preparation can be transferred into the evaporation container through the thus opened connecting pipe. This process can be supported by mechanical pressure on the flexible wall of the storage container.

Figure 5:
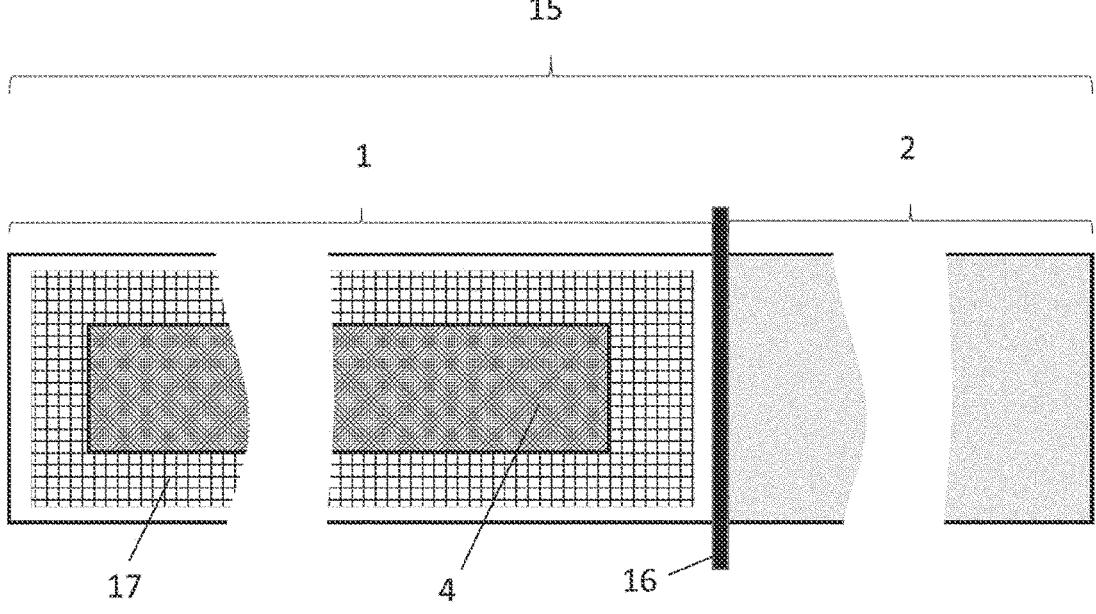
FIG. 5 shows a schematic view of a dispenser according to the invention, in which the outer shell of the evaporation container and the storage container are formed by a liquid-tight, sealed foil bag.

FIG. 5 shows a schematic view of a dispenser according to the invention, in which the outer shell of the evaporation container and the storage container are formed by a liquid-tight, sealed foil bag 15. The dispenser is shown in view of the underside with the gas-permeable membrane inserted into a window in the outer shell, which forms the evaporation surface. The storage container 2 is separated from the evaporation container by the clamping device 16. It is filled with the liquid formic acid preparation before the dispenser is placed. In the evaporation container 1 there is an inner skeleton 17 in the form of a grid to ensure wetting of the gas-permeable membrane in the evaporation container spread flat until the liquid phase is almost completely evaporated.

LIST OF REFERENCE SIGNS

1 Evaporation container
2 Storage container
3 Honeycomb alley
4 Evaporation surface; gas-permeable, fine-pored membrane
5 Connecting pipe
6 Clamp
7 Heat insulating layer
8 Air flow path
9 Elastic screen fabric
10 Packing
11 Honeycomb frame
12 Top beam
13 Spacer

14 Centre wall
15 Foil bag
16 Clamping device
17 Inner skeleton

LIST OF CITED NON-PATENT LITERATURE

Amrine J, Noel R (2006): Formic acid fumigator for controlling *varroa* mites in honey bee hives, International Journal of Acarology, DOI: 10.1080/01647950608684452.

Aumeier P, von der Ohe W, Beinert P, Kirchner W (2011): Use MAQS® wisely!ADIZ Die Biene-Imkerfreund 05 2015, p. 12-13

Charriere J-D (1998): Five formic acid dispensers compared, www.imkerverband-sgap.ch/up/files/DispenserVergleich_Agro-scope1998.pdf Daniels R S, Abdulkareem H, Roger R EL, MacKenzie K (1999): Membrane-barrier delivery of formic acid, a chemical used for mite control in honey bees (*Apis mellifera*). Journal of Apicultural Research 38, 63-69

Johnsen B K (1954): On the influence of salt additives on the phase equilibrium of aqueous formic acid, e-collection-.library.ethz.ch/eserv/eth:32505/eth–32505-02.pdf.

Liebig G: Einfach imkern—Leitfaden zum Bienenhalten, Verlag Dr. G. Liebig, Emscherstr. 3, Bochum, 3rd ed. Aichtal 2011

The invention claimed is:

1. A dispenser for receiving and evaporating a liquid formic acid preparation for combating *varroa* mites in a bee hive, comprising:
    an evaporation surface;
    an evaporation container with dimensions adapted to one of:
        insertion into an air-flowing honeycomb alley leading through a brood nest; and
        placing on upper beams of honeycomb frames of brood nest without spatial extension of the bee hive;
    a storage container connected to the evaporation container and sealed from an outside in a vapour-tight manner for storing an entire treatment dose of the liquid formic acid preparation until a time of combatting *varroa* mites by a formic acid treatment; and
    a closable liquid-conducting connection between the storage container and the evaporation container for transferring the liquid formic acid preparation from the storage container to the evaporation container;
    wherein the evaporation surface comprises a liquid-impermeable and a gas-permeable, fine-pored membrane with a solid content of less than 70% and continuous, exclusively gas-filled pores with a width of between 10 nm and 1000 nm as part of an outer boundary of the evaporation container, wherein said membrane is impermeable to liquid mixtures of formic acid and water and liquid-tight during a treatment period under a dynamic pressure of the liquid formic acid preparation; and
    wherein, for dispensing formic acid vapour, the gas-permeable, fine-pored membrane is arranged adjacent to a space through which a gas can flow including one of:
        one or more honeycomb alleys; and
        a channel integrated in the evaporation container and leading through the one or more honeycomb alleys.

2. The dispenser according to claim 1, comprising:
    the evaporation container for placing on a plurality of upper supports of the honeycomb frames in the hive;

a closed film bag formed of a flexible, liquid-tight, weldable polymer resistant to formic acid;

a sealing outer removable clamp separating the interior of the film bag into two formic acid preparation containers, the storage container and the evaporation container; and a liquid-impermeable and gas-permeable membrane forming an underside of the evaporation container or part thereof.

3. The dispenser according to claim 1, having an inner skeleton in the evaporation container for ensuring t flow of the liquid formic acid preparation onto the liquid-impermeable and gas-permeable membrane.

4. The dispenser according to claim 1, comprising a stackable package and a sealed connection between the storage container and the evaporation container which opens when the evaporation container is removed from the stackable package.

5. The dispenser according to claim 1, having an evaporation surface area of less than 30 cm$^2$.

6. A method of treating a bee colony with the formic acid vapour by means of the dispenser of claim 1, characterized by positioning the evaporation container in an air space of the bee hive without expanding the evaporation container spatially and without using an empty honeycomb frame, comprising: bringing the evaporation container into close heat-conducting relationship with brood nest combs; placing the evaporation surface under the dynamic pressure of the entire treatment dose of the liquid formic acid preparation;

and exposing the membrane-limited evaporation surface to an air-flow space of the one or more honeycomb alleys in the brood nest.

7. The method according to claim 6, comprising placing the evaporation container in the honeycomb alley of the brood nest or in a space bounded by the brood nest combs.

8. The method according to claim 6, in which, prior to the construction of the brood nest combs, a space provided between the honeycomb frames for receiving one of the evaporation container and the dispenser.

9. The method according to claim 6, wherein placing the evaporation surface comprises placing a treatment dose reservoir connected to the evaporation container is outside the bee hive.

10. The method according to claim 6, wherein placing the evaporation surface comprises fitting a flatly spread storage container at a location including one of the on the honeycomb frames under a lid of the bee and between two honeycomb frames without spatial extension of the bee hive.

11. The method according to claim 10, wherein the evaporation container is placed on the honeycomb frames in such a way that the liquid-impermeable and gas-permeable membrane thereof is exposed in several honeycomb alleys in the brood nest.

12. The method according to claim 10, comprising covering the evaporation container with a heat insulating layer.

13. The dispenser of claim 2, wherein the flexible, liquid-tight, weldable polymer resistant to formic acid is selected from a polyethylene and a polypropylene.

* * * * *